(12) United States Patent
Kelley et al.

(10) Patent No.: US 7,171,564 B2
(45) Date of Patent: Jan. 30, 2007

(54) UNIVERSAL PASSWORD GENERATION METHOD

(75) Inventors: Edward E Kelley, Wappingers Falls, NY (US); Franco Motika, Hopewell Junction, NY (US); James B Webb, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 10/232,010

(22) Filed: Aug. 29, 2002

(65) Prior Publication Data

US 2004/0044896 A1   Mar. 4, 2004

(51) Int. Cl.
*H04K 1/00*   (2006.01)
*H04L 9/00*   (2006.01)
*G06F 1/02*   (2006.01)
*G06F 7/58*   (2006.01)

(52) U.S. Cl. .................. 713/183; 380/265; 708/252
(58) Field of Classification Search ................ 713/183, 713/184; 726/4, 17, 21, 27
See application file for complete search history.

(56) References Cited

U.S. PATENT DOCUMENTS

| | | | | |
|---|---|---|---|---|
| 4,801,870 | A * | 1/1989 | Eichelberger et al. | 714/736 |
| 6,041,412 | A | 3/2000 | Timson et al. | |
| 6,094,721 | A | 7/2000 | Eldridge et al. | |
| 6,678,707 | B1 * | 1/2004 | Butler | 708/250 |
| 6,892,307 | B1 * | 5/2005 | Wood et al. | 726/8 |
| 2002/0186086 | A1 * | 12/2002 | Curiger et al. | 331/78 |
| 2003/0037262 | A1 * | 2/2003 | Hillhouse | 713/202 |
| 2003/0163738 | A1 * | 8/2003 | Couillard | 713/202 |
| 2004/0003332 | A1 * | 1/2004 | Kim et al. | 714/744 |
| 2005/0135621 | A1 * | 6/2005 | Burdine et al. | 380/265 |
| 2005/0188290 | A1 * | 8/2005 | Motika et al. | 714/733 |

OTHER PUBLICATIONS

Gabber, Evan, Phillip Gibbons, Yossi Matias, Alain Mayer. How to Make Personalized Web Browsing Simple, Secure, and Anonymous. Lecture Notes in Computer Science: Financial Cryptography. Feb. 1997, pp. 17-32.*

Gabber, Evan, Phillip Gibbons, David Kristol. On Secure and PSeudonymous Client Relationships with Multiple Servers. ACM Transactions on Information and System Security, vol. 2, No. 3, Nov. 1999, pp. 390-415.*

(Continued)

*Primary Examiner*—Christopher Revak
*Assistant Examiner*—Michael A. Cervone
(74) *Attorney, Agent, or Firm*—DeLio & Peterson, LLC; Robert Curcio; James J. Cioffi

(57) ABSTRACT

A method is provided for a user to generate a password for a software application accessible from a computer system which includes a universal password generator (UPG). The UPG includes a specified parameter for generating the password, and the software application requires the password includes a specified parameter. The UPG is initiated and the universal password is inputted into the UPG. The specified parameter required by the application, and the UPG specified parameter are inputted into the UPG. The universal password is processed such that the specified parameter of the UPG, and the specified parameter of the application are used to generate the password. The password is then transferred to the application requiring the password. The password may be saved and associated in the UPG with the program such that when the user re-enters the program, the UPG program retrieves the password for reuse in the program.

20 Claims, 12 Drawing Sheets

OTHER PUBLICATIONS

Gabber, Evan, Phillip Gibbons, David Kristol, Yossi Matias, Alain Mayer. Consistent, yet anonymous, web access with LPWA. Communications of the ACM. vol. 42, No. 3, 1999. pp. 42-47.*

Shieh, Ming-Der et al. High-Speed Generation of LFSR Signatures. 2000.*

Elguibaly, Fayez et al. Multiple-Input Signature Registers: An Improved Design. 1997.*

* cited by examiner

LSFR Configuration Table

| LSFR Config. | Default URL | URL 1 | URL 2 | URL n |
|---|---|---|---|---|
| Select between the SISR or MISR. | 512 | | | |
| Specify the length of the LFSR (i.e. 32-bits, 64-bits, 128-bits, 256-bits, or any bit length). | 514 | | | |
| Select the feedback locations (polynomial type). | 516 | | | |
| Select between the standard or modular LFSR structure. | 518 | | | |
| Select the number and location of input bits. | 520 | | | |
| Set initial conditions or seed. | 522 | | | |
| Specify the number of shift cycles per data input. | 524 | | | |
| Specify the number of idle or dummy shift cycles. | 526 | | | |
| Select the output latch locations. | 528 | | | |
| | | | | |
| | | | | |

FIG. 6

Rules Table 600

| Config. 602 | Select 604 | Length 606 | Alpha / Numeric 607 | Number Alpha 608 | Position 610 |
|---|---|---|---|---|---|
| URL 1 (612) | 9 | 8-12 | AN | 2 | 2, -2 |
| URL 2 (614) | 8 | 6-8 | AN | 0 | |
| URL 3 (616) | 10 | 7-12 | AN | 3 | 3,-2,-1 |
| URL n (618) | | | | | |

FIG. 7

UNIVERSAL PASSWORD GENERATION METHOD

BACKGROUND OF THE INVENTION

1. Field of the Invention

The present invention relates to methods for generating unique passwords for multiple software and hardware applications, and more particularly, to a method for generating unique passwords for multiple software and hardware applications from one data string.

2. Description of Related Art

The rapid growth of personal computers, internet applications, and distributed computing, along with expanded personal security requirements has proliferated the need for individual password generation and maintenance. Typically, the user needs to create a unique password fitting a multitude of parameters, and repeat this process when the password expires or another software application requires a password. Often a user needs to generate, update and maintain many passwords at the same time for several software applications accessed locally, via a network or on the internet or the like on a multitude of systems. Passwords can be forgotten, lost, and require updating and recording the update. Further, recording the passwords can increase the likelihood of a security breach since recorded passwords may be discovered by unauthorized persons. The problem is further complicated by the differences in rules and restrictions or limitations imposed by each system or application during this password generation process.

Thus, the user can have many passwords for an equal number of applications which must be periodically changed, updated, recorded for retrieval, and meet a multitude of parameters such as length or alphanumeric combinations. In addition to the mechanics of maintaining these passwords, the user must tolerate the tedious task of selecting an "easy to remember" non trivial password that conforms to the specific system's password generation rules and restrictions. After multiple update iterations and when using many password requiring applications, this task usually becomes difficult and time-consuming.

Bearing in mind the problems and deficiencies of the prior art, it is therefore an object of the present invention to provide a method for generating a password using an easy to remember universal password.

It is another object of the present invention to provide a method and device for generating multiple passwords for use in a plurality of application from a single universal password which may include an alphanumeric data string, or text phrase.

It is a further object of the present invention to provide a method and device which generates a password meeting specified parameters defined by a software application, from a universal password which may include an alphanumeric data string.

It is yet another object of the present invention to provide a method and device for generating a plurality of unique passwords for use in a plurality of applications, from physical identification data such as digital fingerprints.

It is another object of the present invention to allow for data storage of personal datum such as digital fingerprints on memory-limited devices such as credit cards to provide passwords for applications according to the present invention.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for generating a password using a computer system which comprises providing a universal password generator (UPG) for creating the password from a universal password which may include an alphanumeric data string, and the UPG communicates with the computer system. The UPG may be integral with the computer system, and the UPG may include a software program, or a hardware element. The method provides a software application being accessible to the UPG and the computer system. The software application may be accessible using a computer network or the internet. The application requires a first password including a first specified parameter. The universal password generator is initiated and the universal password is inputted into the universal password generator. The first specified parameter of the application is inputted into the universal password generator, and the universal password and the first specified parameter are processed using the computer system and the UPG to generate the first password. A second specified parameter defined by the UPG may also be inputted into the UPG and processed. Further, a plurality of second specified parameters defined by the UPG may be inputted which include a data string length, and a bit length. Also, processing may include at least one means for random data encoding. The first password is then transferred to the application requiring the first password.

In a related aspect, the steps may be repeated, from providing the application to transferring the first password, for a second application which requires a second password including at least one specified parameter. The universal password may be inputting into the universal password generator to provide the second password to the second application.

In another related aspect, after the step of transferring the first password, the method of the present invention may include saving and associating in the UPG the first password with the first program, and retrieving from the UPG program the first password for reuse in the first program when a user re-enters the first program.

In yet another related aspect, the step of processing the universal password may include processing identification datum which is digitalized and encoded by the universal password generator, and may also include identification datum being stored and retrievable from a data storage means, which may include a credit card.

In another aspect of the present invention a method for a user to generate a password for a software application accessible from a computer system which comprises a universal password generator (UPG) integral with the computer system. The UPG includes at least one specified parameter for generating the password, and the software application requiring a first password including a first specified parameter. The universal password generator is initiated and the universal password is inputted into the universal password generator. The first specified parameter required by the application is inputted into the universal password generator, and the specified parameter of the UPG is inputted into the UPG. The universal password is processed such that the specified parameter of the UPG, and the first specified parameter of the application are used to generate the first password. The first password is then transferred to the application requiring the first password. The first password is then saved and associated in the UPG with the first program such that when the user re-enters the first program, the UPG program retrieves the first password for reuse in the first program.

In a related aspect, the step of processing the universal password includes, processing an identification datum which is digitalized and encoded by the universal password generator, and the identification datum is stored and retrievable from a data storage means, which may include a credit card.

In yet another aspect of the present invention, a computer system having access to an application requiring a password comprises a universal password generator (UPG) for creating the password from a universal password. The computer system may be part of a portable device for accessing a secure device requiring the password. The UPG includes at least one specified parameter for creating the password. A first password is required by a first application where the first application includes a first specified parameter for the first password. The computer system further includes processing means integral with the UPG which accepts the specified parameter from the UPG, the first specified parameter from the first application, and the universal password, and generates the first password meeting the requirements of the first specified parameter of the application, and the specified parameter of the UPG. The first password is then transferred to the application requiring the first password.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 6 is a diagram of a preferred LSFR configuration table disclosed in step 314 of the flow chart shown in FIG. 3 according to the present invention.

FIG. 7 is a diagram of a preferred rules table disclosed in step 354 of the flow chart shown in FIG. 4 according to the present invention.

DESCRIPTION OF THE PREFERRED EMBODIMENT(S)

Figure 1:
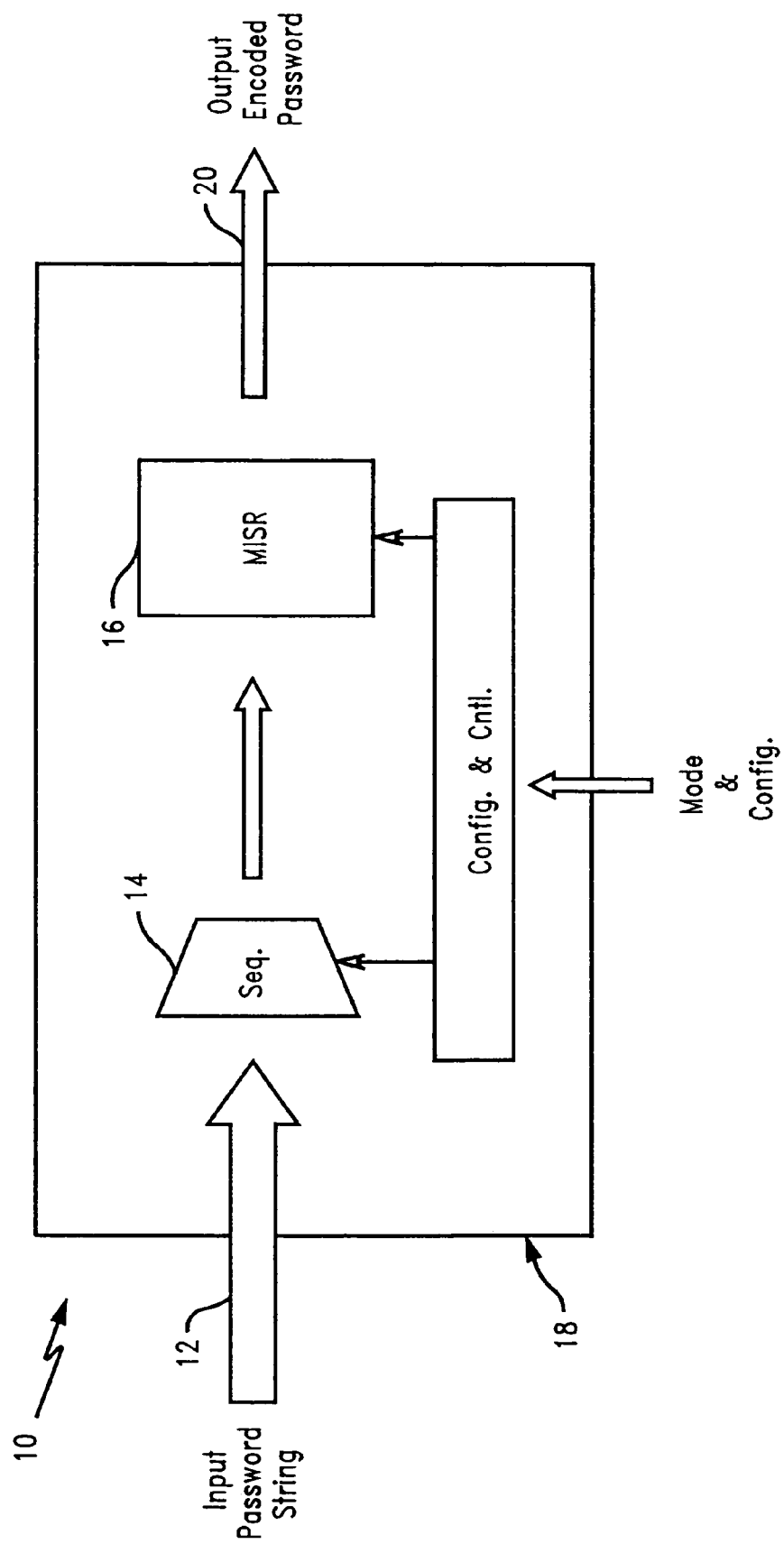
FIG. 1 is a block diagram of a basic sequence for encoding a password according to the present invention.

In describing the preferred embodiment of the present invention, reference will be made herein to FIGS. 1–12 of the drawings in which like numerals refer to like features of the invention. Features of the invention are not necessarily shown to scale in the drawings.

The present invention provides a solution to the problem of inconsistent and cumbersome password generation across a broad range of operating systems, networked systems, communication systems, and many diverse software and hardware applications. It further minimizes password generation restrictions such as sequence and length, while providing extendibility to future personal security data password sequencing.

The overall idea of the present invention consists of combining the theory of autonomous Linear Feedback Shift Register (LFSR) machines in conjunction with signature analysis, or encryption concepts used with Single Input Signature Register (SISR) or Multiple Input Signature Register (MISR). These concepts are then integrated in a secure system environment with standard arguments and interface.

A block diagram 10 of the Universal Password Generation function is shown in FIG. 1. The Input Password String parameter 12 represents a variable length personal identification data string. This string may consist of an easy to remember sentence of characters or any string of data bits representing a physical identification feature. A minimal restriction for the input data may be as simple as not allowing for a null string, a minimal length string, or as complex as the system administrator desires. Processing the input 12 includes a sequencer 14 for shifting and feeding the bits of data, serial or parallel, into the MISR 16 (or SISR). The output 20 of the functional block 18 is a configurable fixed bit length encoded password. The specific length can be optimized to the operating system's platform and security robustness needs.

The mode and configuration parameters 18 are intended to personalize the operation of the encoding function. The parameters may include: selecting between the SISR or MISR; specifying the length of the LFSR (i.e. 32 bits, 64 bits, 256 bits or any bit length); selecting the feedback locations (polynomial type); selecting between the standard or modular LFSR structure; selecting the number and location of input bits; setting the initial conditions or seed; specifying the number of shift cycles per data input; specifying the number of idle or dummy shift cycles; selecting the output encoded password length; and selecting the output latch locations.

The implementation of the Universal Password Generation Function can be realized as a hardware feature or as a software module. The encoding algorithm may require minimal hardware and software code to implement and integrate within an application or operating system. The hardware implementation of the above methodology is advantageous because it requires relatively low circuit overhead.

Figure 2:
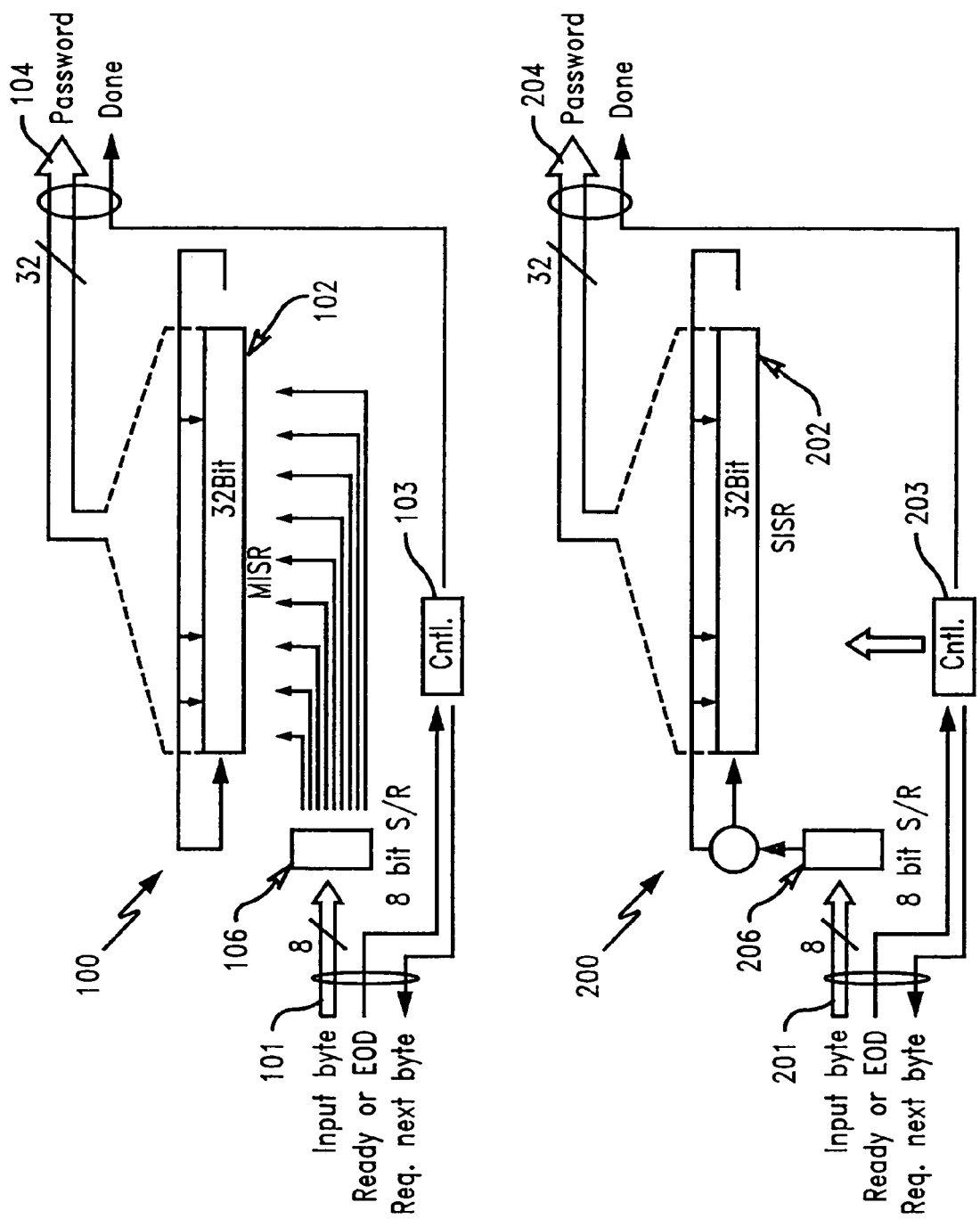
FIG. 2 is a block diagram of input and output data using a 32 bit MISR and SISR system.

FIG. 2 shows an example of a typical hardware embodiment for a 32 bit 102 MISR system 100 with an 8-bit data input 101, and similarly a 32 bit 202 SISR system 200 with an 8-bit data input 201 parallel to the serial shift registers 102, 202. In the MISR implementation, system 100, each bit of the 8-bit input 101 is fed into the shift register simultaneously 106. The control device 103 shifts and feeds the bits of data (serial or parallel) into the MISR (similar to the sequencer 14 shown in FIG. 1), and configures the LFSR (MISR/SISR) using all the available parameters, for example, feedback locations, output bits, and shifting.

Similarly, the SISR system 200 also feeds 8 bits of input 201 into the shift register 202, but only a single bit at a time 206. In a similar manner to the control device 103 for the MISR system 100, the control device 203 for the SISR device 200 shifts and feeds the bits of data into the MISR and configures the LFSR (MISR/SISR) using all the available parameters. For both the SISR and MISR systems 100, 200, the register is shifted, with bits feeding back into the register at specified locations. Once all input bits have been read in, the MISR output value 104, and the SISR output value 204 can be read as the encoded password. Software code can easily emulate either of the above hardware configurations. The advantageous versatility of the idea described herein allows such password generation to be implemented on hardware, in software, on any operating system, and in any programming language.

One of the novel features of the Universal Password Generation Method of the present invention is it supports unrestricted variable lengths personalized input data to generate the secure password. The concept can be easily extended to a broad class of password based software and hardware applications. This unrestricted input data can be viewed as an indefinite string of binary bits representing a physical or virtual identifier such as: digital fingerprints; facial characteristics; eye structure; vocal identification; and DNA profiling. The examples herein of digital identification datum can be digitalized and then encoded into a universal password or signature using the present invention. This universal signature, representing a massive data value such as a digital fingerprint, can be stored as a much smaller value stored on devices such as credit cards and driver's licenses, for use in generating applicable unique passwords. Furthermore, the encoding algorithm can be implemented in hardware and integrated into an access subsystem such as an ATM, computer operating system, or credit card validator.

A method for generating multiple, unique passwords, each meeting a plurality of requirements, from an easy to remember password data string or datum, heretofore has not been presented in the art. The present invention solves the problems associated with creating and storing multiple passwords each requiring updates and specified application parameters.

More specifically, the proposed solution is advantageous because it is a universal solution that simplifies the password generation process with minimum restrictions and limitations. The advantages include: unlimited input identification string length; easy to remember password sentence; standard fixed length encoded password for easy internal system processing; password based on standard LFSR encoding techniques; and password customized encoding by selecting LFSR configuration attributes. Further advantages of the method of the present invention include: robust security extensions (i.e. 32 bits, 64 bits, 256 bits or any bit length); simple and efficient software or hardware encoding implementation; and extension to special identification data.

The method of the present invention can be used by any provider of hardware computing systems, software operating systems, databases, internet browsers, and a multitude of software applications that require secure access. In addition to computer data processing application, the method of the present invention can also be used in communication systems requiring secure access. In sum, the method of the present invention can be used by any system providing hardware or software that uses passwords.

Figure 8:
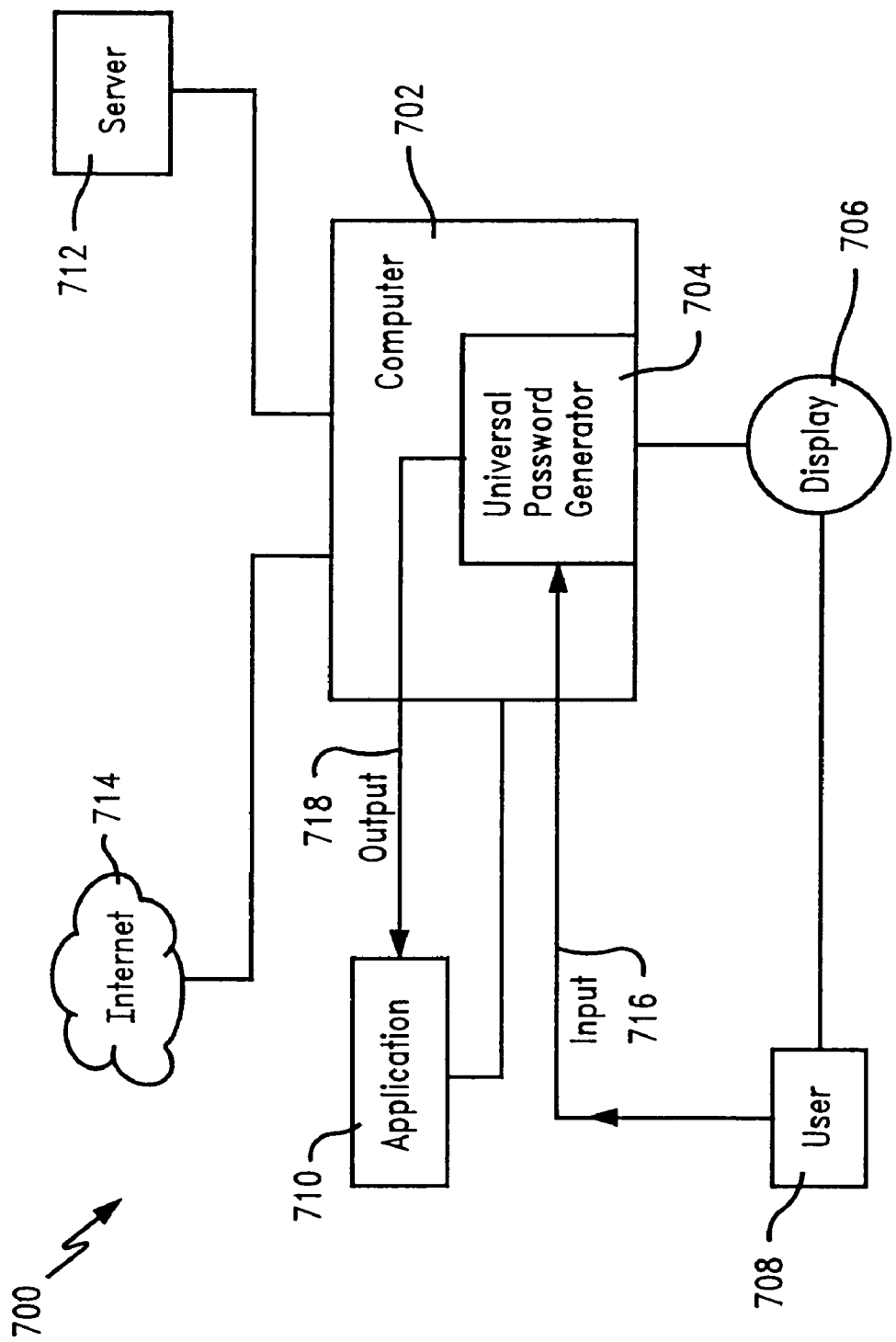
FIG. 8 is an illustrative depiction of the Universal Password Generator of the present invention and a facilitating system.

Referring to FIG. 8, a schematic diagram 700 is shown depicting a system embodying the present invention. A computer 702 includes the UPG 704 according to the present invention, an application, and is connected to a display 706. The UPG may be integral with the computer (as shown in FIG. 8), or may be separate and communicating with each other. The UPG 704 receives an input 716 from the user's 708 computer 702, and directs it's password output 718 to a passworded application 710. The computer 702 may also be connected to the internet 714 and/or a server 712 accessing applications on each of these sources as well. The method of the universal password generation of the present invention is herein shown in FIGS. 1–12, and depicted in the flowchart 300 shown in FIGS. 3–5.

I. Flow Chart of a Preferred Embodiment

Figure 3:
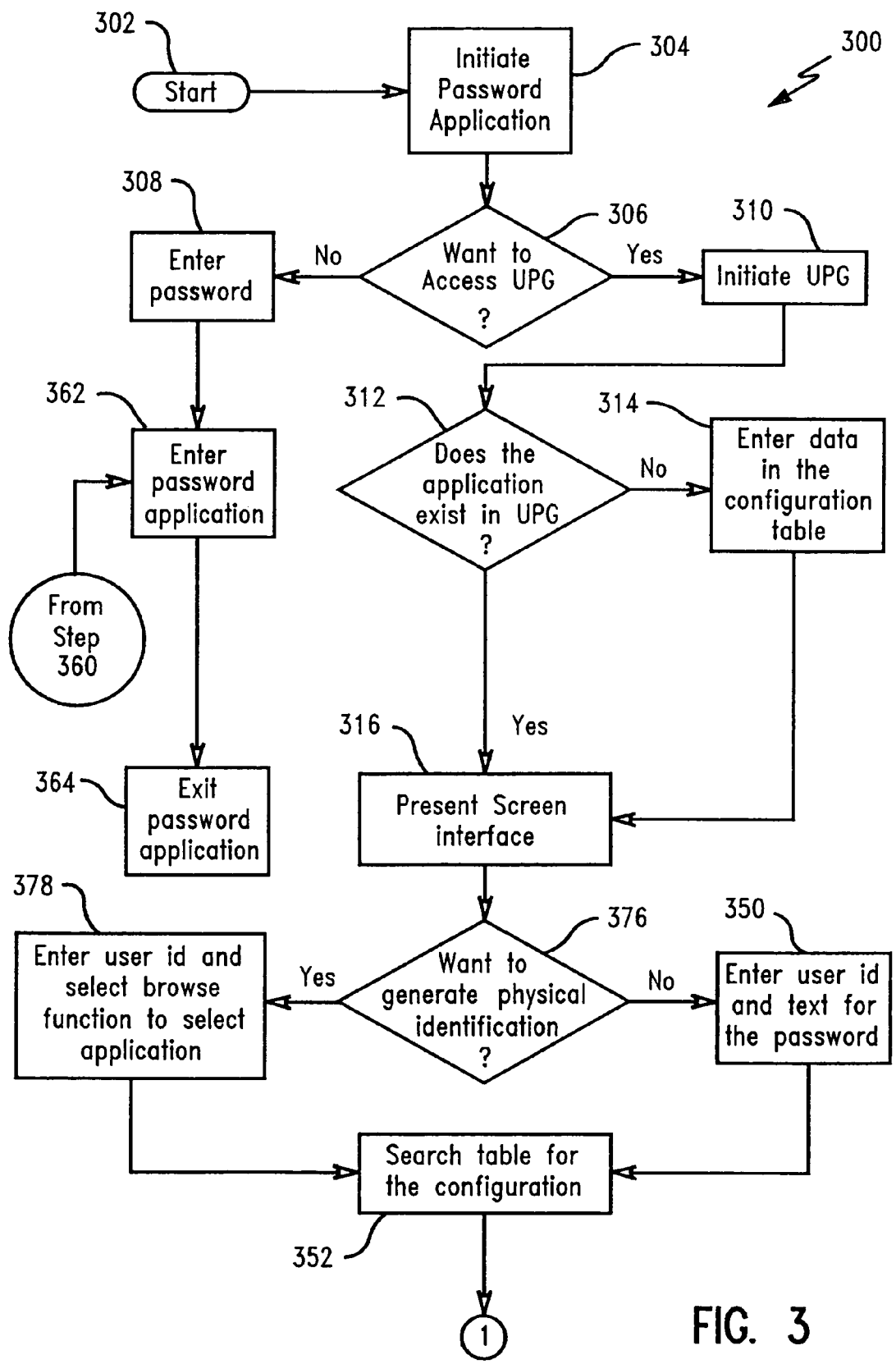
FIG. 3 is a flow chart of a preferred embodiment of the present invention.
Figure 4:
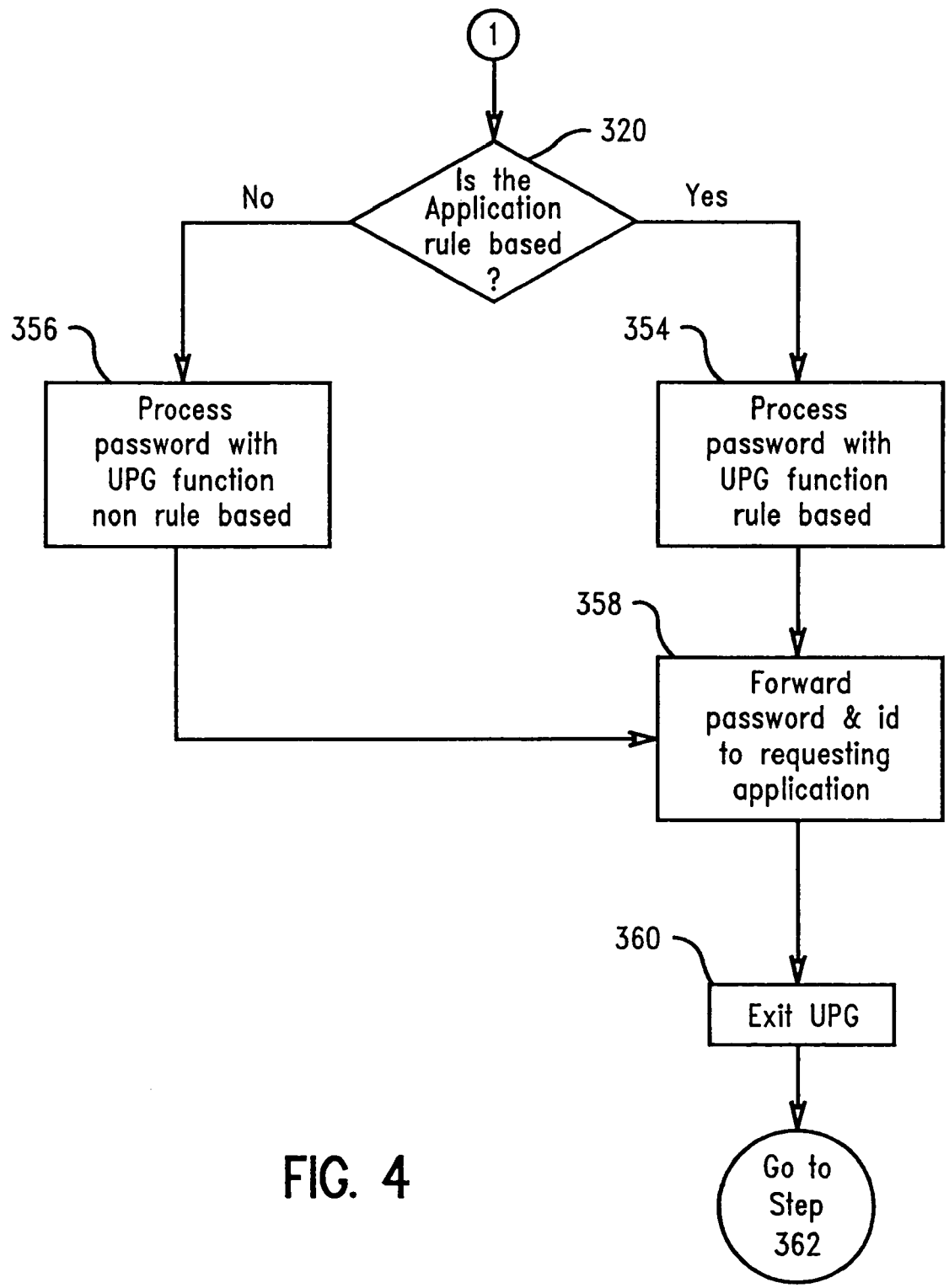
FIG. 4 is a continuation of the flow chart shown in FIG. 3.

Referring to FIGS. 3–4, a preferred embodiment 300 of the method of the present invention begins with starting a system 302, such as, a computer, or an integral computer and universal password generator. When the user enters an application requiring a password 304, the application will preferably display a request to log on as a new user, or log on with a user name and password as a return user. The application 710 may be accessed locally on the users computer 702, or at a network server 712 that the user's computer 702 is connected to, or accessed via the internet 714, as shown in FIG. 8.

The user then decides whether to access the universal password generator (UPG) 306. If the user decides to enter a password manually 308, the user may proceed without initiating the UPG. In this case, the user may enter a password in freeform text that has been manually developed. Continuing, the user then enters the password application 362, and exits the password application when desired 364.

When the user initiates the UPG 310, after answering affirmatively to accessing the UPG 306, the UPG determines if the application already exists in the UPG 312. When a password has previously been generated using the UPG, the configuration for generating the password has been saved and is accessible for reuse. The UPG may then access the previously generated password for this application, which meets all parameters previously entered in the configuration table shown in FIG. 6, and the method proceed to present the screen interface 316.

If the application does not already exist in the UPG 312 the user will proceed to the step of entering data in the configuration table 314, before the method proceeds to the step of presenting the screen interface 316, as shown in FIG. 3. A preferred embodiment of the LSFR configuration table referred to in step 314 is shown in FIG. 6.

a. LSFR Configuration Table

Referring to FIG. 6, the configuration table 500 includes five headings 502–510, and a column of nine parameters 512–528, each specified by the user. The nine parameters are under the heading of LSFR configuration 502. There is a default URL column 504 of parameters, and a configuration column for each URL saved (URL1 506, URL2 508, URLn 510) that uses a unique generated password. Allowing multiple configurations enables the Universal Password Generator to use the same input for multiple applications, and generate unique passwords for each password requesting application. The configuration parameters included are described below.

The user selects between the SISR (Single Input Shift Register) or MISR (Multiple Input Shift Register) 512 options. The choice of either SISR or MISR is preferably determined by the comparison of advantages and disadvantages of SISR versus MISR. The advantages of SISR include data which is more randomly encoded compared to MISR with equivalent optional parameters. This better encoding is due to the fact that once the bit is fed into the shift register it is shifted. The next bit is fed in and then shifted again. Each time the register is shifted the data becomes encoded due to the feedback mechanism. However, the disadvantages of SISR include longer compression time, compared to MISR with equivalent optional parameters, due to the single bit input described above.

A disadvantage of MISR is less random encoding of data compared to SISR, however, equivalent optional parameters are available. The lesser randomness of the encoding using MISR is due to MISR taking multiple inputs of data before shifting the register, thus the data is not encoded as randomly as in the SISR. An advantage of MISR compared to SISR is shorter compression times compared to SISR with equivalent optional parameters due to MISR inputting multiple bits of input at one time. The ability to select between SISR or MISR, provides another variable parameter which increases the security of the encryption. The more variables that are present in establishing a password the more secure that password becomes because the probability of someone matching all the variables to generate the same password decreases at an exponential rate relative to the number of variables.

The next parameter in the LSFR configuration table, shown in FIG. 6, asks the user to specify the length of the Linear Feedback Shift Register (LFSR) (e.g. 32-bits, 64-bits, 128-bits, 256-bits, or any bit length) 514. The length of the LFSR determines the "length" of the encrypted password, and thus essentially defines the level of encryption of the password. The level of encryption is increased when the length of the LFSR increases because the additional length adds variables in establishing the password. Therefore, the password becomes more secure because the probability of someone matching all the variables to generate the same password decreases at an exponential rate.

The user next selects the feedback locations (polynomial type) 516, as shown in (FIG. 6). The feedback enables the register to compress the data into a unique signature representing a password according to the method of the present invention. The feedback can be to a variable number of locations, for example, from one (1) to the total number of bits in the LFSR. This variable number of feedback can be represented as a polynomial. A polynomial is defined in mathematics as an algebraic expression consisting of one or more summed terms, each term consisting of a constant multiplier and one or more variables raised to integral powers. Additionally, a polynomial can be defined as an expression of two or more terms.

The polynomial may vary for each system providing a parameter at the system level that can change for each system. For example, if a user enters in the password "Mary Had A Little Lamb" into the UPG on one system, which represents an encrypted password of 01101110 in the system password table, that same user could enter the same password on another system with differing feedback locations which would result in a completely different encrypted password of 11110010.

Next, as shown in FIG. 6, the user must select the number and location of input bits 520. This applies to MISR where the user can specify the number of bits (from one (1) to the size of the LFSR), or size of input to feed into the MISR. This provides another variable parameter which, as stated above, increases the security of the encrypted password.

The next parameter requires setting initial conditions or seed 522, as shown in (FIG. 6). This defines the initial condition of the SISR or MISR. The SISR/MISR contains Boolean values, thus, the SISR/MISR must be initialized to some value equivalent to some combination of 1s and 0s. Differing initial conditions will provide different encrypted passwords. This is because the initial values in the SISR or MISR will be fed back into itself after shifting via the feedback algorithm, thus, the initial values will affect the overall value of the resulting encrypted password.

The next parameter shown in FIG. 6, requires the user to specify the number of shift cycles per data input 524. This defines how many times the LFSR is clocked for each inputted bit of data. Clocking the LFSR is synonymous with shifting the bits in the register. Although the LFSR must be clocked at least once to input the data, subsequent clocks can be issued to continue to shift the LFSR before feeding in more input data. Performing subsequent shifts further mixes the data.

The next parameter shown in FIG. 6, requires the user to specify the number of idle or dummy shift cycles 526. This is similar to specifying the number of shift cycles per data input, except the LFSR can be clocked after all input has been clocked into the LFSR. This provides another variable parameter for increasing security to the password.

The final parameter shown in FIG. 6, column 502, includes selecting the output latch locations 528. Specific latches in an LFSR can be specified for output. For example, the final parameter 528 may have a 256 LFSR (an LFSR containing 256 bits) but only specify 16 of the bits to be output. The variability of the number and location of bits to be outputted to the security of the password generation method, increases the difficulty in attempting to compromise the password and the password system.

Once the user enters the data in the LSFR configuration table 500 shown in FIG. 6, or the information was stored in the UPG from accessing the application previously and completing the entries in the LSFR table 500 previously, the UPG screen interface is presented (step 316, FIG. 3) on a display 706 for the computer 702, shown in FIG. 8. Once the user has selected yes to the question posed in step 306, the next step in the method of the present invention shown in FIG. 3 is to present the screen interface 316.

b. Password Interface Screen

Figure 5:
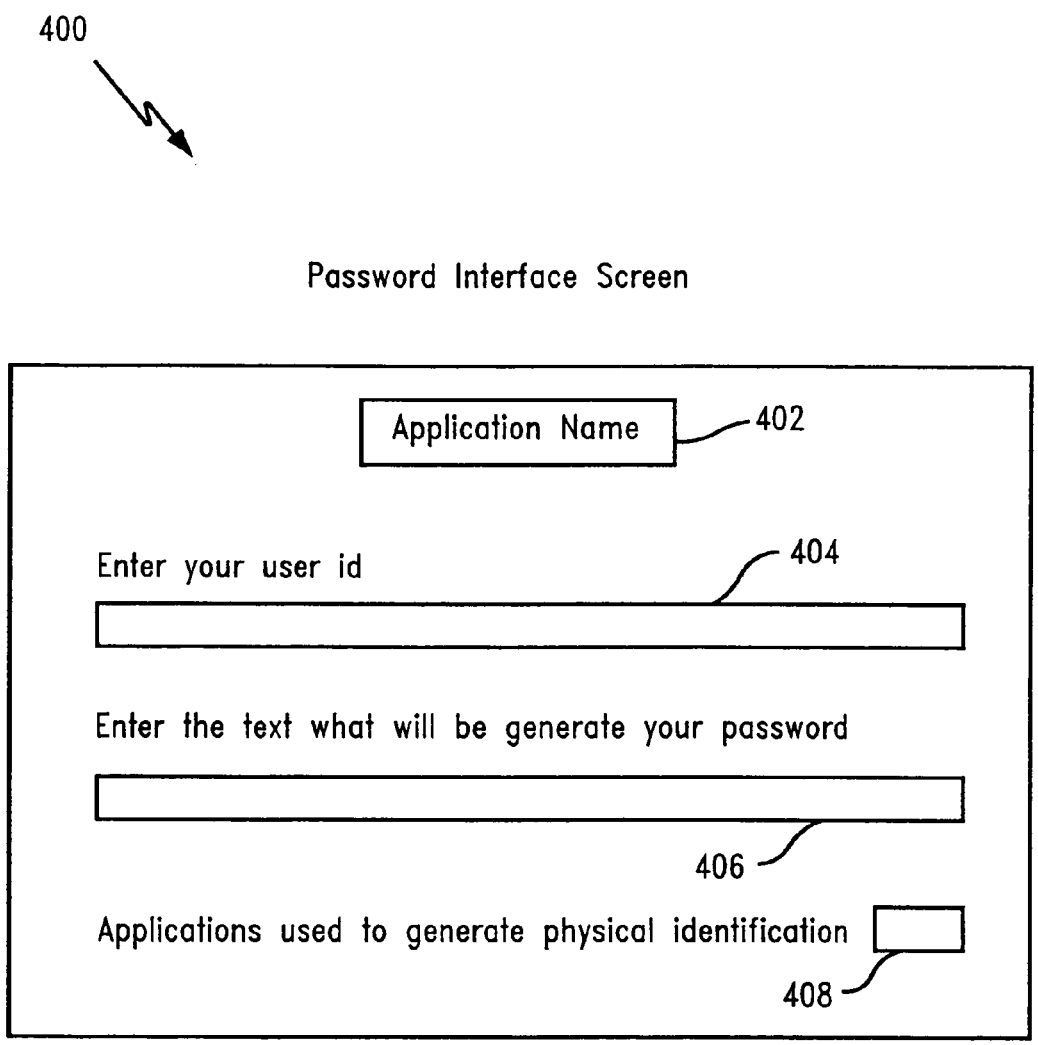
FIG. 5 is a diagram of an embodiment of the password interface screen disclosed in step 316 of the flow chart shown in FIG. 3 according to the present invention.

The screen interface step 316 is depicted as shown in FIG. 5. As shown in FIG. 5, the password interface screen 400 includes the application name 402, and several preferred data entry spaces 404–408. The user must enter the user identification (id) 404, and the text to be used to generate the password 406. A check box is also provided for indicating whether an application(s) will be used to generate physical identification 408. The physical identification may be provided using an appropriate application by generating bits of data that are characteristic of a physical characteristic of a person. Digital fingerprints, facial characteristics, eye structure, vocal identification, DNA profiling, and other like characteristics are examples of characteristics which may be used as physical identification.

If the user checks the box for generating physical identification 408, the method (shown in FIGS. 3–4) proceeds to collect the datum by initializing an application for digitalizing datum 378, shown in the flow chart of FIG. 3.

Next on the display shown in FIG. 5, the user enters the user id 404 and the text for generating the password 406, filling in the appropriate text blocks 404, 406. The user id 404 is particular to the application requiring the password and may be of the user's choosing. The text for the password 406 is any text that the user wishes to choose for the password, such as, alphanumeric text, or a phrase. An advantage of the present invention is that the length and other parameters of the text do not have to correspond to the password requirements of the application. The configuration table 500 shown in FIG. 6, and discussed above under subsection "a", will provide incorporation of the parameters required by the application and inputted by the user to the application password, resulting in the particular advantages of the present invention which include high security and ease of use.

Referring to FIG. 3, the process flow of the present invention proceeds to the question of whether the user wishes to generate physical evidence 376, which is initiated when the box 408 is checked (FIG. 5) in the interface screen 400. If the user answers in the negative to generating physical identification 376 the user enters the id and text for the password 350, shown in interface screen 400 of FIG. 5. If the user answers affirmatively to generating physical identification 376, the user enters an id and selects an application for processing physical data 378. The method depicted in the flow chart shown in FIG. 3, next proceeds to search the table for the configuration 352 as a result of either answering the question posed in step 376 as "yes", via step 378, or "no", via step 350.

The method of the present invention continues from the steps depicted in FIG. 3 to the steps depicted in FIG. 4. The next step of the method of the present invention, shown in FIG. 4, asks if the application is rule based 320. The user answers the question based on whether the password application has any rules which are required in the password format. An example of password rules are, for instance, a password that must be of length 8 to 12 characters with at least one of the characters being numeric, and may include further rules such as requiring the position of the numeric characters not to be in the first or last position of the password.

If the application is non-ruled based, the UPG will next process the password with the UPG non-rule based function 356, shown in FIG. 4. In a non-rule based function, the output of the Universal Password Generator does not have to conform to any particular character in any position of the password. The password is generated using the configuration of the LFSR stored in the LSFR Configuration Table shown in FIG. 6. The particular configuration to use is found by using the URL from the requesting password application to find the stored configuration data. If the URL is not found in the table, the Default URL 504 from the table shown in FIG. 6 is used as the source of the configuration data.

If the application is ruled based, the UPG will next process the password with the UPG rule based function 354. Password applications may have a requirement or a combination of requirements including, specific length or range of length, character type such as alpha numeric, or position of characters. Explanation and examples of rule based requirements are found in the rules table of FIG. 7.

c. Rules Table

Referring to FIG. 7, the rules table 600 includes six horizontal headings. The first horizontal heading 602 defines the column beneath it as the configuration column. The select column 604, length column 606, alpha/numeric column 607, number alpha column 608, and position column 610 define successive columns from left to right, such that URL1–URLn 612–618 define the parameters for each URL. URL1 612 includes a length requirement from 8 to 12 characters that are alpha numeric (column 606) with at least two numeric characters (column 608) located from the second character moving from left to right and from the second character moving from right to left (column 610). The select 604 column is filled in by the user to indicate the desired length of the password within the parameter set in the length column 606. The UPG Function will match this requirement by calculating the maximum length in bits to satisfy this condition. For example, using 16 bits to represent a character, the UPG function will examine 16 bits at a time in order to match the requirement for URL1 in FIG. 7. If the requirement is for an alpha character in position one (1), the UPG function examines 16 bit groups moving from left to right until an alpha character is found. Characters not fitting this requirement are discarded. After finding a character, the UPG function will continue searching for characters from left to right.

Referring to FIG. 4, after the password has been generated, both the rule based option 354 and the non-rule based option 320 proceed to forward the password and "id" to the requesting application 358, and exit the UPG 360. The process flow according to the method of the present invention can then proceed to enter the passworded application 362, shown in FIG. 3. Finally, the user exits the passworded application 364 when desired.

Thus, is disclosed a preferred method according to the present invention which provides solutions to multiple problems and restrictions encountered in the process of generating personalized system passwords. The present invention achieves this by including password generation which accepts unlimited input data lengths and physical identification, thereby allowing for easy to remember password sentences with minimal limitations or physical identification. The output of the method of the present invention results in an encoded password generated by a robust encoding algorithm where the password meets all requirements of the password application, or the password is a personalized, unique, digitalized datum.

II. Linear Feedback Shift Resister

Expanding on the discussion above regarding the use of MISR and SISR for password generation, and referring to FIGS. 9–12, basic pseudo random pattern generation techniques are shown using Linear Feedback Shift Registers (LFSRs). The use of the LFSR configured as a Multiple Input Signature Register (MISR) or Single Input Signature Register (SISR) to compress data and generate signatures is also shown.

Although the LFSR has many uses in testing, communication, and encryption applications, one of the utilization here includes the LFSR as a source of pseudo random binary sequences. The LFSR is a special configuration of a "linear circuit" into a special form of shift register or counter. These circuits require only a clock input, making them autonomous, and consists of three basic logic components: a latch of D-type flip flop or a unit delay; an exclusive-OR (XOR) or modulo-2 adder; and a Modulo-2 scalar multiplier.

Figure 9:
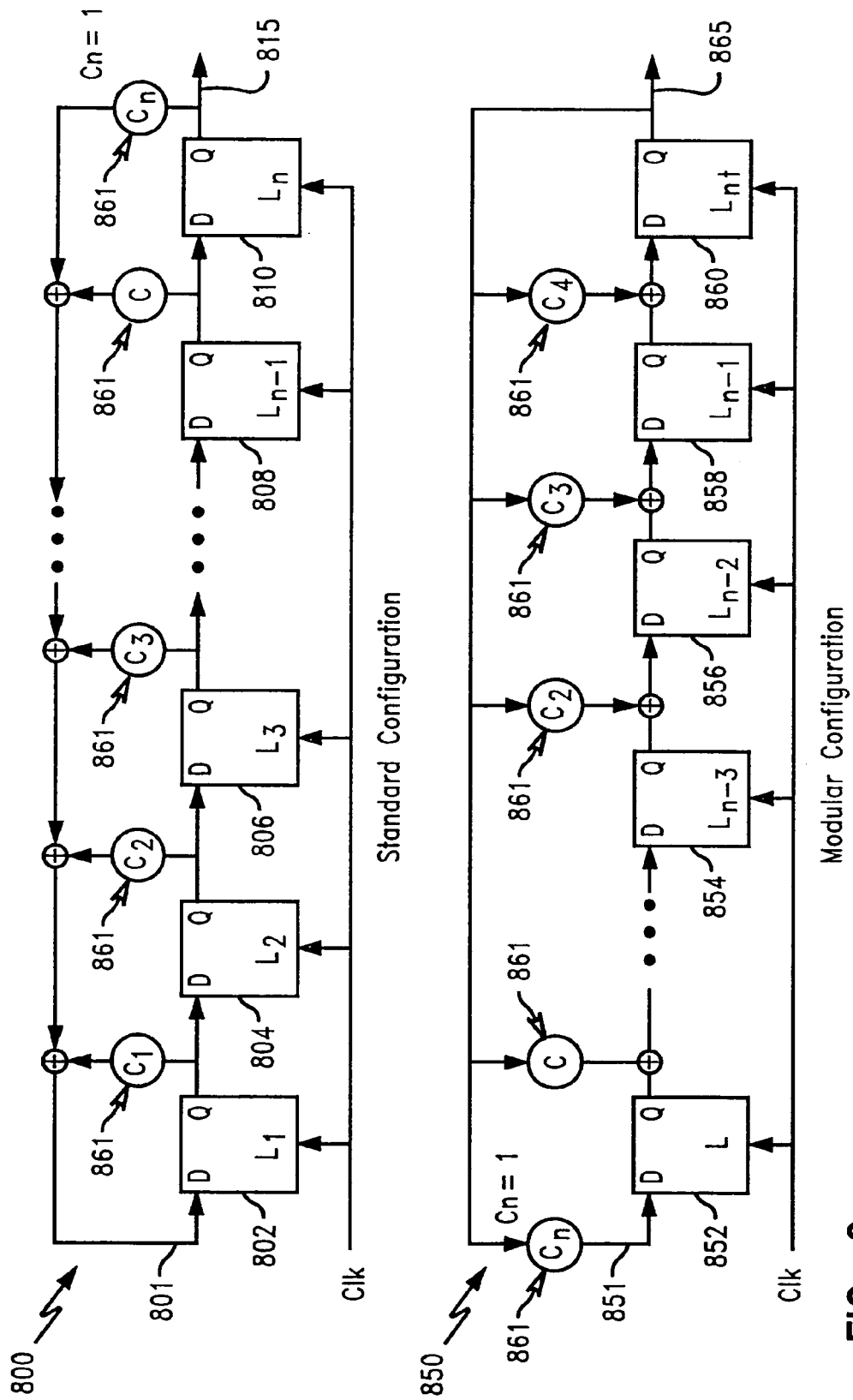
FIG. 9 is a block diagram of standard and modular configurations for data encryption according to the present invention.
Figure 10:
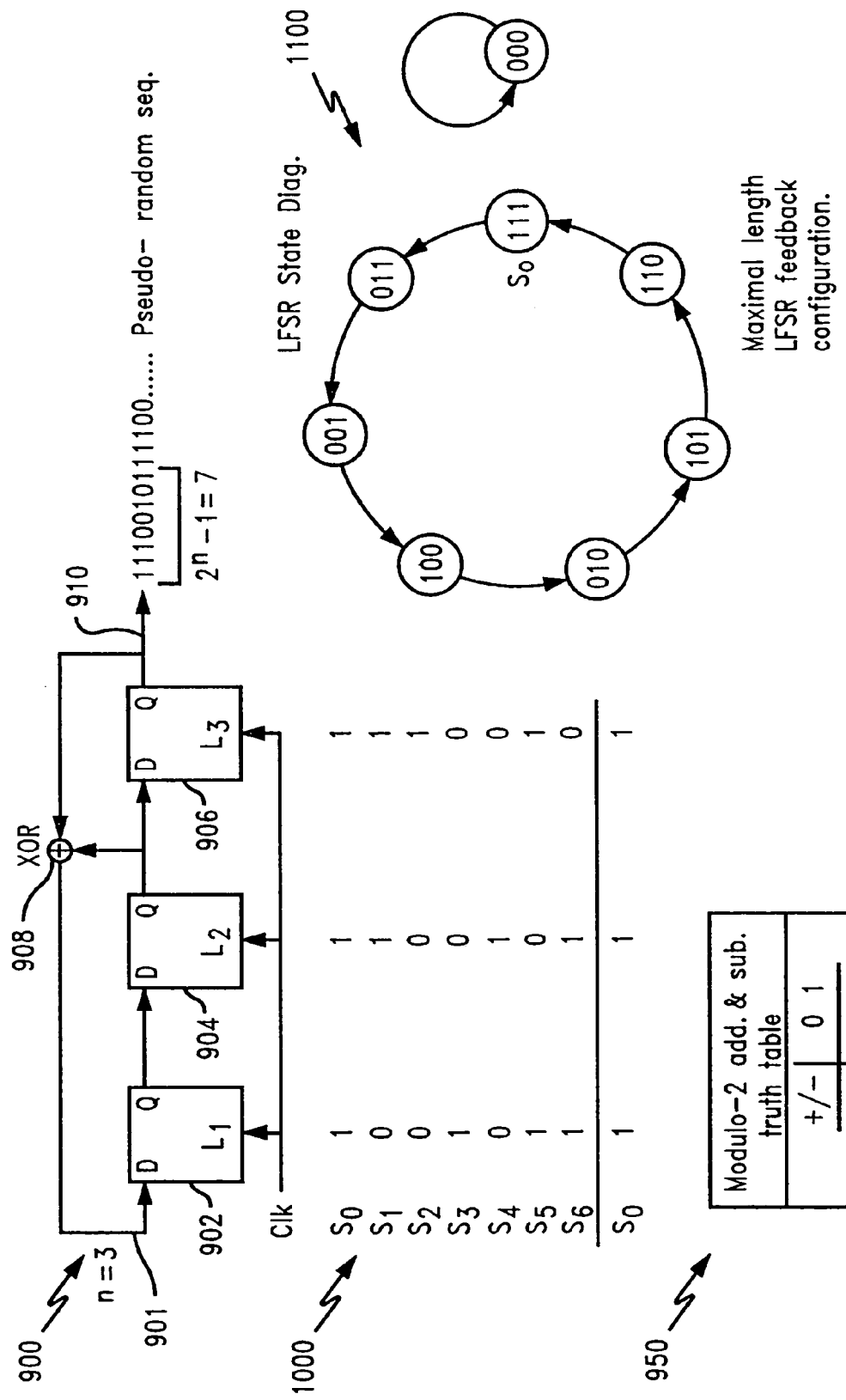
FIG. 10 depicts a block diagram, truth tables, and an illustrative diagram of a data encryption methodology according to the present invention.

The LFSR circuit can take either of two equivalent or dual forms. FIG. 9 depicts both types, the "standard" 800, and "modular" 850 configuration or a generic LFSR. Each cell 802, 860, respectively, in each type of configuration has the same structure and is replicated for the desired length of the LFSR. The modulo-2 850 scalar multiplier ($C_i$) is either 0 or 1, which results in a connection or no-connection for the feedback signal. Each coefficient element 861 represented by the letter "C" stands for a polynomial coefficient corresponding to a "0" or "1" in this binary implementation. Defining the coefficient 861 as a "0" or a "1" determines whether that feedback loop is turned on or off. In the LFSR, the coefficient "Cn" is always equal to 1, however, all other coefficient values are configurable to either "0" or "1" and are specified as a variable parameter. The modulo-2 adder 850 is equivalent to an exclusive-OR logic circuit. The truth table 950 for the modulo-2 adder 850 and a simple example of an LFSR 1100 is shown in FIG. 10. The standard LSFR circuit includes an input 801, data 802–810, and an output 815. The modular configuration 850 of the circuit includes an input 851, data 852–860, and an output 865.

Referring to FIG. 10, some of the characteristics of a LFSR are its length or number of cells (n), the feedback configuration or values of $C_i$, and the initial state of the circuit. A "maximal length" LFSR is a circuit that cycles through $2^n-1$ unique states when initialized with a non-zero value. The maximum number of states of a length shift register is $2^n$, so a maximal length LFSR cycles through all possible states except when initialized to zero. A non-maximal length LFSR also cycles through a sub-set of $2^n$ states depending on the initial seed or initial value. For the purpose of our concept's effectiveness, we shall consider only maximal length LFSR implementations.

The example, in FIG. 10, a simple three state (n=3) maximal length configured LFSR 900 is shown. The outputs from latches $L_2$ 904, and $L_3$ 906 are XORed 908 and feed back to $L_1$ 902 to provide an input 901, resulting in an output 910. The state table 1000 and diagram 1100 show the sequence of states that the LFSR cycles through after being initialized to all "1"s at state $S_o$. The binary output sequence for this example is seven bits "11100101" before it starts repeating. A two value addition and subtraction truth table 950 is also shown in FIG. 10.

One skilled in the art can extend the length of this circuit to provide long sequences of binary pseudo random numbers. For example, a 32-bit maximal length LFSR can cycle for over four billion states before repeating. Furthermore, by selecting the appropriate feedback parameters for the LFSR, one can generate unique sequences for each configuration. Maximal configuration tables for many values of "n" are available in standard known references or can be generated.

III. Signature Analysis Shift Register (SISR and MISR)

Figure 11:
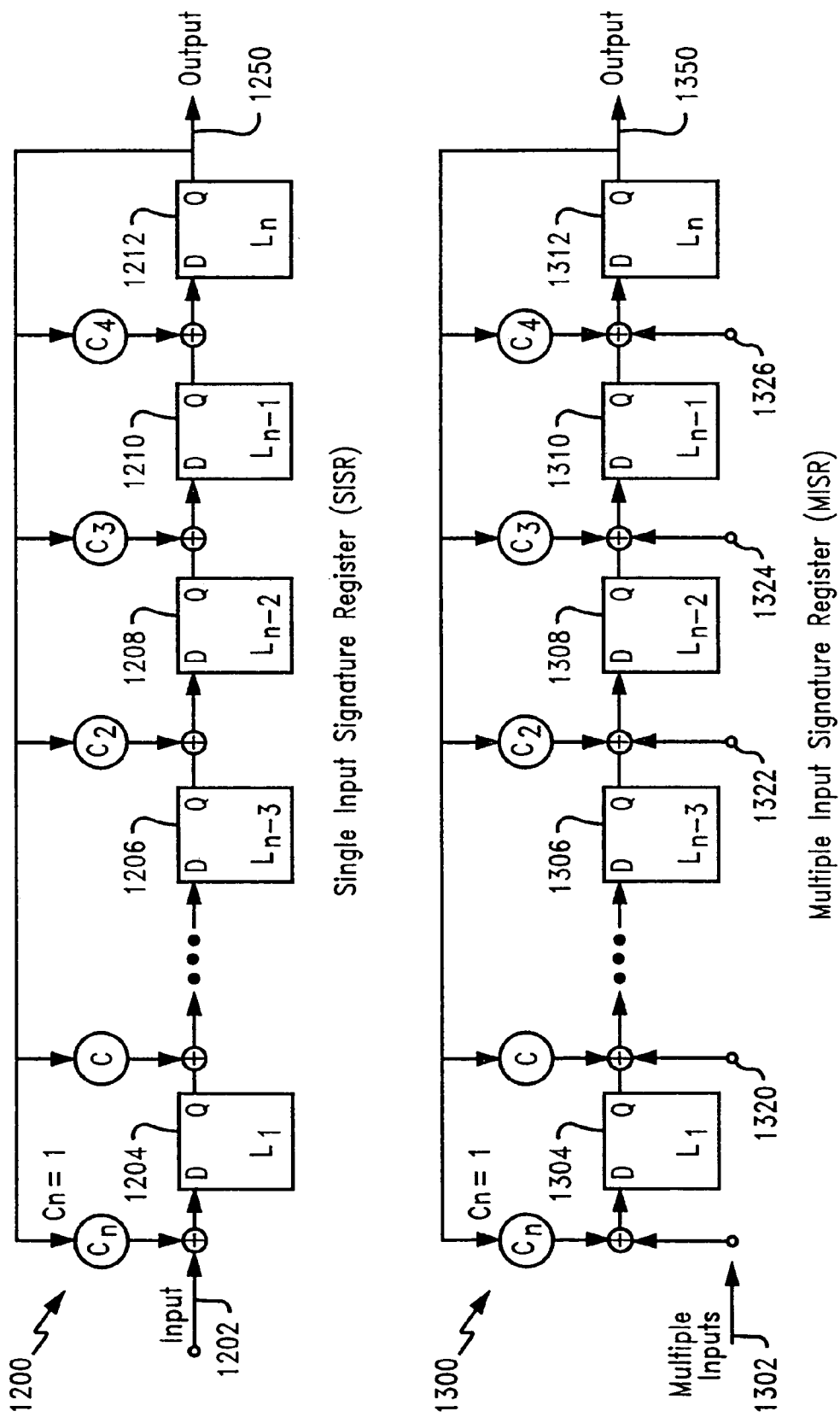
FIG. 11 is a block diagram of data input and password output using the SISR and MISR methods according to the present invention.
Figure 12:
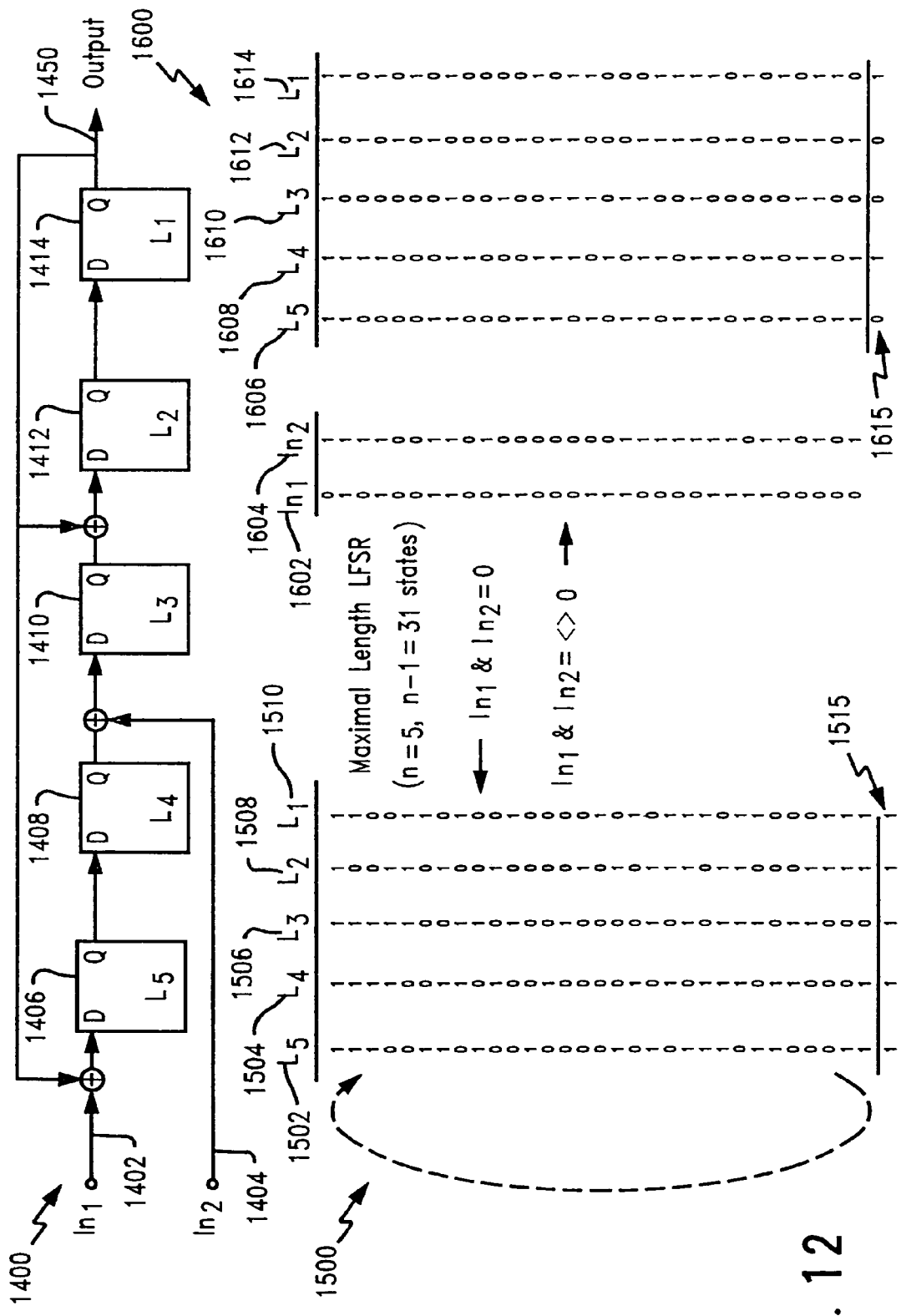
FIG. 12 depicts a block diagram and truth tables for multiple data input providing an output according to the present invention.

Referring to FIGS. 11–12, depictions of the general operation and characteristics of the LFSR when used for data compression as a signature generation register is shown. There are many data compression algorithms and hardware implementations that can be used to generate signatures, but the use of a LFSR as a SISR or MISR has the advantage that is can be implemented in both hardware and software with low aliasing probability and a high degree of customization flexibility.

The basic concept consists of XORing one or more bits of input data on every Nth shift cycle of the LFSR. Typically, data is clocked into the LFSR on every shift cycle. The LFSR can be configured as a single input SISR or as a multiple input MISR. The single input configuration 1200, shown in FIG. 11, is usually used to serially compress long data bit strings, while the multiple input configuration can be used for simultaneous parallel compression of multiple bits groups such as a byte or word of input data. The MISR 1200 includes an input 1202 having data bits 1204–1212, and output 1250. The MISR 1300, shown in FIG. 11, includes an input 1302 having data bits 1304–1312, and 1320–1326, and output 1350.

The data inputs to the LFSR can be XORed at any point in the recalculating shift register. Of course, the maximum number of possible single inputs of ran N-length LFSR is N. If the number of inputs is greater than N, one caught easily increase the length of the LFSR or XOR subsets of inputs for each MISR input. The out or signature of the SISR or MISR is usually the final state of the LFSR after all the data has been compressed or shifted into the LFSR. The length of the output signature can be the whole length of the LFSR 1204–1212 for the SISR 1200, and the whole length of the LFSR 1304–1312 for the MISR 1300, or a truncated portion of N data bits.

The MISR or SISR can be further customized by selecting the initial seed or state prior to data compression, selecting the feedback configuration, input structure, number of shift cycles per data bits(s), and lengths of the LFSR. The length of the LFSR can be optimized for a particular system platform (i.e. 32-bits, 256-bits, or any bit length) or tailored for security robustness. FIG. 12 includes an MISR example 1400 of a 2-input 1402, 1404, five (5) data bit 1406–1414 MISR, with the associated state or truth tables 1500, 1600 for two input data sequences. The first state table 1500 includes heading $L_1$–$L_5$ 1510–1502 and the truth table result row 1515. The second state table or truth table 1600 includes inputs $in_1$ 1602 and $in_2$ 1604, heading $L_1$–$L_5$, and truth table result row 1615. Table 1500 demonstrates the n–1 possible sequences of data values obtained by simply shifting the LFSR without any input; just the initial seed settings. On the same note, Table 1600 shows the same process but with input being fed in as it is shifted. These two tables demonstrate how the data values change as the LFSR is being shifted with and without input.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for generating a password using a computer system, comprising:
 providing a universal password generator (UPG) for creating the password from a universal password, and the UPG communicating with the computer system;
 providing a software application being accessible to the UPG and the computer system, the application requiring a first password including a first specified parameter;
 initiating the universal password generator including combining autonomous Linear Feedback Shift Register (LFSR) machines in conjunction with signature analysis comprising:
  selecting between a Single Input Signature Register (SISR) or a Multiple Input Signature Register (MISR);
  specifying a length of said LFSR;
  selecting feedback locations;
  selecting between a standard or modular LFSR structure;
  selecting a number and location of input bits;
  setting initial conditions;
  specifying a number of shift cycles per data input;
  specifying a number of idle or dummy shift cycles;
  selecting an output encoded password length; and
  selecting output latch locations;
 inputting the universal password into the universal password generator;
 inputting the first specified parameter of the application into the universal password generator;
 processing the universal password and the first specified parameter using the computer system and the UPG to generate the first password; and
 transferring the first password to the application requiring the first password.

2. The method of claim 1 further comprising repeating the steps from providing the application to transfering the first password for a second application, the second application requiring a second password including at least one specified parameter and inputting the universal password generator to provide the second password to the second application.

3. The method of claim 1 wherein the step of processing the universal password includes, a second specified parameter defined by the UPG.

4. The method of claim 1 wherein the step of processing the universal password includes, a plurality of second specified parameters defined by the UPG which include a data string length, and a bit length.

5. The method of claim 1 further including after the step of transferring the first password, saving and associating in the UPG the first password with the application, and retrieving from the UPG the first password for reuse in the application when a user re-enters the application.

6. The method of claim 1 wherein the step of processing the universal password includes, the first specified parameter and at least one means for random data encoding.

7. The method of claim 1 wherein the universal password generator includes a software program.

8. The method of claim 1 wherein the universal password generator includes a hardware element.

9. The method of claim 1 wherein the universal password generator is integral with the computer system.

10. The method of claim 1 wherein the application is accessed via a computer network.

11. The method of claim 1 wherein the application is accessed via the internet.

12. The method of claim 1 wherein the step of processing the universal password includes, processing identification datum which is digitalized and encoded by the universal password generator.

13. The method of claim 1 wherein the step of processing the universal password includes processing identification datum which is digitalized and encoded by the universal password generator, and the identification datum is stored and retrievable from a data storage means.

14. The method of claim 1 wherein the step of processing the universal password includes, processing identification datum which is digitalized and encoded by the universal password generator, and the identification datum is stored and retrievable from a portable data storage means which includes a credit card.

15. The method of claim 1 wherein the universal password is an alphanumeric data string.

16. A method for a user to generate a password for a software application accessible from a computer system, comprising:
   providing a universal password generator (UPG) integral with the computer system, the UPG including at least one specified parameter for generating the password, and the software application requiring a first password including a first specified parameter;
   initiating the universal password generator including combining autonomous Linear Feedback Shift Register (LFSR) machines in conjunction with signature analysis comprising:
      selecting between a Single Input Signature Register (SISR) or a Multiple Input Signature Register (MISR);
      specifying a length of said LFSR;
      selecting feedback locations;
      selecting between a standard or modular LFSR structure;
      selecting a number and location of input bits;
      setting initial conditions;
      specifying a number of shift cycles per data input;
      specifying a number of idle or dummy shift cycles;
      selecting an output encoded password length; and
      selecting output latch locations;
   processing the universal password, the specified parameter of the UPG, and the first specified parameter of the application to generate the first password;
   transferring the first password to the application requiring the first password;
   saving and associating in the UPG the first password with the application; and
   retrieving from the UPG the first password for reuse in the application when the user re-enters the application.

17. The method of claim 16 wherein the step of processing the universal password includes, processing an identification datum which is digitalized and encoded by the universal password generator, and the identification datum is stored and retrievable from a data storage means.

18. The method of claim 16 wherein the step of processing the universal password includes, processing an identification datum which is digitalized and encoded by the universal password generator, and the identification datum is stored and retrievable from a portable data storage means which includes a credit card.

19. A computer system having access to an application requiring a password, which comprises:
   a universal password generator (UPG) for creating the password from a universal password, the UPG including at least one specified parameter for creating the password;
   a first password required by a first application, the first application including a first specified parameter for the first password; and
   a processing means integral with the UPG which accepts the specified parameter from the UPG, accepts the first specified parameter from the first application, accepts the universal password, and generates the first password meeting the requirements of the first specified parameter of the application, and the specified parameter of the UPG, and transfers the first password to the application requiring the first password, including combining autonomous Linear Feedback Shift Register (LFSR) machines in conjunction with signature analysis comprising:
      selecting between a Single Input Signature Register (SISR) or a Multiple Input Signature Register (MISR);
      specifying a length of said LFSR;
      selecting feedback locations;
      selecting between a standard or modular LFSR structure;
      selecting a number and location of input bits;
      setting initial conditions;
      specifying a number of shift cycles per data input;
      specifying a number of idle or dummy shift cycles;
      selecting an output encoded password length; and
      selecting output latch locations.

20. The computer system of claim 19, wherein the computer system is part of a portable device for accessing a secure device requiring the password.

* * * * *